United States Patent
Jahnsman

[15] 3,687,031
[45] Aug. 29, 1972

[54] MINIATURE CAMERA

[72] Inventor: William E. Jahnsman, 3940 Chippewa Drive, Boulder, Colo. 80303

[22] Filed: Feb. 5, 1970

[21] Appl. No.: 8,907

[52] U.S. Cl. ............................95/11 R, 95/12, 95/44
[51] Int. Cl. .................................................G03b 3/00
[58] Field of Search................................95/11, 12, 44

[56] References Cited

UNITED STATES PATENTS

| | | | |
|---|---|---|---|
| 446,374 | 2/1891 | Whitney | 95/12 |
| 2,882,791 | 4/1959 | Moller | 95/12 X |
| 3,272,105 | 9/1966 | Manderfeld | 95/42 |
| 441,064 | 11/1890 | Goldscmid | 95/44 |

*Primary Examiner*—John M. Horan
*Attorney*—Richard D. Law

[57] ABSTRACT

A compact miniature camera having a binocular type viewing system incorporated to sight along the hollow shafts of 35 mm. film spools includes an adjustable viewing system to accommodate different eye spacings. The film spools are mounted on each side of the camera housing to move 35 mm. film across a flat bottom wall of the camera housing, and an object lens mounted between the film spools transmits light to a reflecting mirror for directing light radiating from the object area to be photographed onto the film positioned on the bottom wall portion. Photo cell means for sensing light intensity along with controls for setting the focus, aperture opening and shutter speed of the camera are provided.

2 Claims, 6 Drawing Figures

Patented Aug. 29, 1972

3,687,031

INVENTOR
WILLIAM E. JAHSMAN
BY
Richard H. Law
ATTORNEY 3,687,031

MINIATURE CAMERA

The present invention relates to cameras, and more particularly to a compact camera structure which is suitable for use with standard 35 mm. film. Cameras of such compact construction are commonly called miniature cameras.

Heretofore, various cameras for use with 35 mm. film have been designed. These prior art cameras, however, generally have not been of the truly miniature camera class since the arrangement of their components have usually required a substantial volume and their shapes have most often been relatively bulky.

It is, accordingly, an object of the present invention to provide an improved miniature camera characterized by its compact structure and which is suitable for use with 35 mm. film.

It is further an object of the present invention to provide an improved camera which incorporates a binocular type viewing system for viewing the object area to be photographed, thereby substantially eliminating parallax between the viewing system and the object lens system of the camera.

It is additionally an object of the present invention to provide an improved camera having means for adjusting the binocular type viewing system to accommodate different eye spacings.

In accomplishing these and other objects, there has been provided, in accordance with the present invention, a miniature camera having a compact housing structure which defines a substantially flat bottom wall portion. Adjustably mounted at the central front portion of the camera housing is an object lens. Mounted behind the object lens is a light reflecting means for reflecting light entering the object lens onto the bottom wall portion of the camera. Film spool means having hollow shafts are rotably mounted on each side of the camera housing for selectively moving a film, such as a 35 mm. film, across the bottom wall portion of the camera. Adjustable optical means are mounted to sight through the shafts of each spool means to provide a binocular type viewing system optically aligned with the optical axis of the object lens. The binocular type viewing system includes adjustable viewing means for accommodating the viewing system to different eye spacings. Adjustable photo cell means are mounted at the front portion of the camera housing for measuring the intensity of light being radiated from the object area to be photographed. Means are also provided for simultaneously adjusting the focus of the binocular viewing system, the focus of the object lens, and the position of the photo cell means so that the camera may be properly focused for photographing the selected object area. Means are additionally provided for setting the aperture and shutter speed in accordance with the light intensity sensed by the photo cell means.

A better understanding of the present invention may be had from the following detailed description when read in conjunction with the accompanying drawings, in which.

Figure 1:
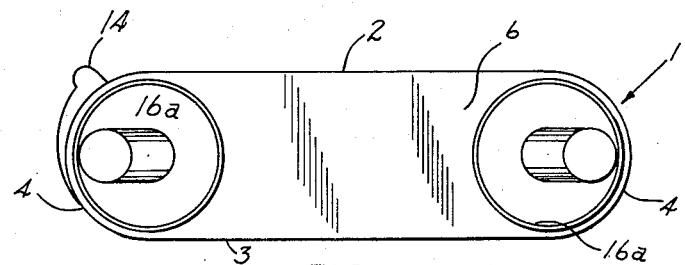
FIG. 1 is a rear elevational view of a camera according to the present invention.

Referring to the drawings in more detail, there is shown in FIGS. 1–4, a miniature camera having a compact housing shown in general by numeral 1. The housing 1 includes a bottom portion 2, a top portion 3, arcuate side portions 4, a front wall 5 and a back wall 6. The bottom and top portions 2 and 3 are substantially flat and preferably mutually parallel. The side portions 4 are formed in the shape of half cylinders facing towards each other and join the bottom and top portions 2 and 3. The front and back walls 5 and 6, which complete the structure of the housing 1, are preferably mutually parallel and are substantially perpendicular to the bottom and top portions 2 and 3.

Centrally mounted on the front wall of the camera housing 1 is an adjustable object lens system shown in general by numeral 10. The lens system 10 is exposed through an opening in the face of the front wall 5 to receive light from the object area to be photographed. The optical axis of the lens system 10 is preferably substantially parallel with the plane of the bottom portion 2 of the housing 1. Fixedly mounted behind the lens system 10 is a light directing means or reflecting mirror 11 for directing light transmitted by the object lens system 10 onto the bottom portion 2. When the bottom is parallel to the axis of the lens system, the reflecting mirror 11 is mounted in the housing 1 so that its reflecting surface makes about a 45° angle to the optical axis of the lens system 10 and the plane of the bottom portion 2.

Figure 4:
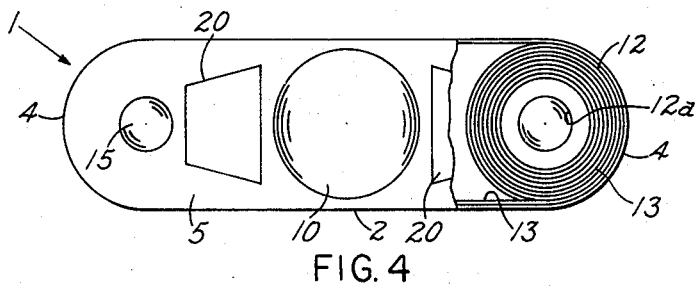
FIG. 4 is a front view of the camera of FIG. 1, partially broken to show the interior arrangement of a film spool.

Film spools 12 are rotably mounted inside the housing side portions 4. The spools 12 have their shafts 12a parallel with the optical axis of the object lens system 10, and the spools 12 are symetrically positioned on opposite sides of the lens system 10. The film spools 12 used in the exemplary camera are designed for standard 35 mm. film. As shown in FIG. 4, 35 mm. film 13 is wound on the spools 12. The spools 12 are operative to feed the film 13 from one spool to the other by drawing it across the bottom portion 2 of the housing 1. Conventional film advance means 14 is shown in FIG. 1 for advancing the film frame by frame from one film spool 12 to the other. Rewind means (not shown), similar to the film advance means 14, were, also, included in an exemplary camera for rewinding exposed film 13 back onto the film spool 12 from which it had been unwound. Such rewind means are conventional. In conventional 35 mm. cameras, film wound on a spool is inserted into the camera and the film is wound on a fixed spool in the camera. After exposing the film, it is rewound on the removable spool. This system is contemplated for the present camera, or it may use the film packs with both spools in the pack.

Figures 5, 6:
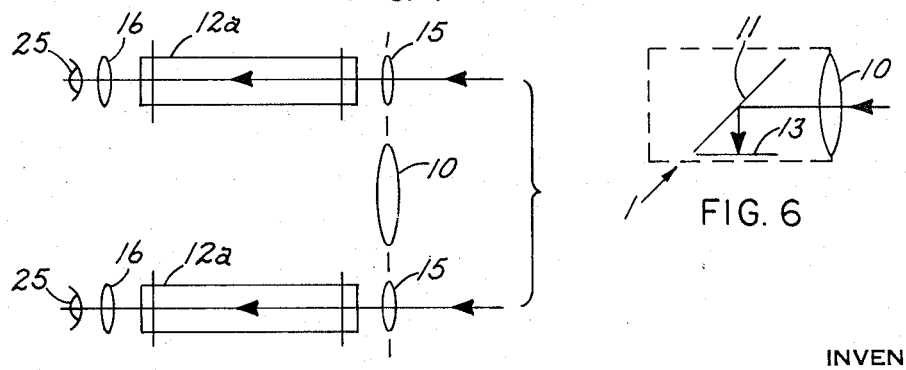
FIG. 5 is a schematic view of the optical elements forming the binocular type viewing system incorporated in the camera of FIG. 1.
FIG. 6 is a schematic view of the optical elements forming the means for directing light from the object area to be photographed onto film in the camera of FIG. 1.

The shafts 12a of the film spools 12 are hollow. Mounted in the camera housing 1, to sight through the hollow shafts 12a are front and rear optical means 15 and 16, respectively. Each of the front optical means 15 includes a movable lens which is exposed through an opening in the front wall 5 so as to view the object area to be photographed. Each of the rear optical means 16 includes a rotatable double reflecting eyepiece system, mounted in a protector shield 16a, which may be rotated to accommodate for individual eye spacing. As shown in FIG. 5, the optical means 15 and 16, along with the barrel portions of the spools 12 defined by the spool shafts 12a, form a binocular type viewing system which is optically aligned with the optical axis of the object lens system 10.

Mounted at the front portion of the housing 1 are conventional photo cell means 20. The photo cell means 20 are symmetrically positioned on opposite sides of the lens system 10 and are exposed through openings in the front wall 5 to receive light radiating from the object area to be photographed. The photo cell means 20 is movably mounted with respect to the front wall 5 so that the photo cells 20 may be positioned to receive light radiating from substantially the same object area viewed by the object lens system 10. The photo cell means may be connected to the object lens system, as in conventional automatic lenses, where desired.

Figures 2, 3:
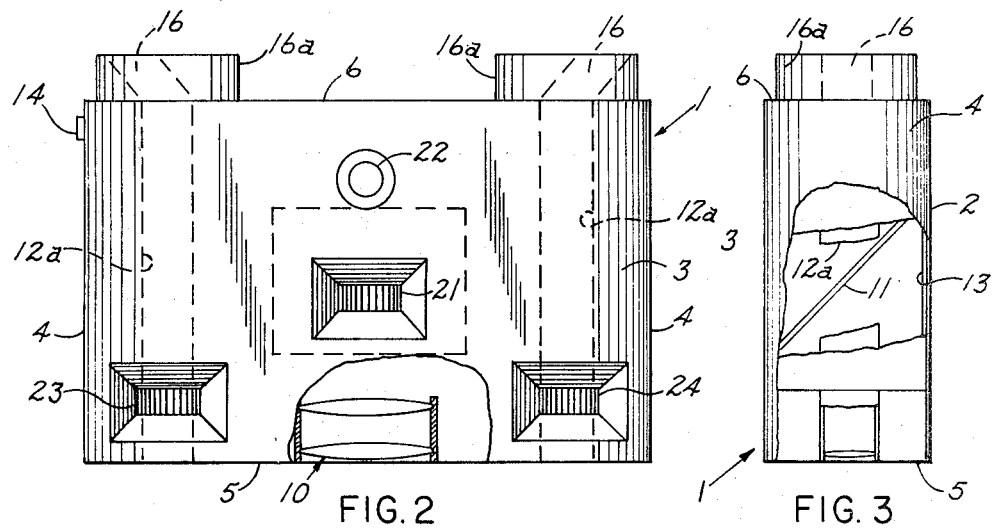
FIG. 2 is a top plan view of the camera of FIG. 1, partially broken to show the interior arrangement of the object lens.
FIG. 3 is a side view of the camera of FIG. 1, partially broken to show the interior arrangement of light reflecting means.

A focus control 21, shown in FIG. 3, is mounted on the top portion 3 of the camera housing 1. The focus control 21 is in the form of a knurled wheel which is geared in a conventional manner, not shown, to the adjustable optical means 15, the object lens system 10 and the photo cell means 20. By turning the control 21, the binocular viewing system provided by the optical means 15 and 16 is focused on the object area to be photographed. Simultaneously with focusing of the binocular viewing system, the control 21 operates to focus the object lens system 10 on the same area to be photographed, and appropriately positions the photo cell means 20 to receive the light radiating from the area to be photographed.

Also, shown in FIG. 2 is a shutter release control 22, an aperture setting control 23 and a shutter speed control 24. The shutter release control or button 22 is located on the housing top portion 3 behind the focus control 21 near a point of balance on the camera so as to minimize camera shake when the shutter release control 22 is actuated. The shutter release control 22 is of a conventional type and is employed to operate a conventional shutter mechanism included in the camera. Such a shutter mechanism may be, for example, of either the between-the-lens or focal-plane type. Additionally, means may be included in the camera for synchronizing the shutter with a flash attachment, as is conventional. The aperture setting control 23 and the shutter speed control 24 are operated by conventional manual controls, in the form of knurled wheels, shown mounted on the housing top portion 3. When manual, the controls 23 and 24 are appropriately set before taking a photograph in accordance with the light intensity sensed by the photo cell means 20. The light intensity sensed by the photo cell means 20 is indicated on an associated light meter (not shown). In an exemplary camera constructed in accordance with the present invention, indicators were associated with the aperture and shutter speed controls. These aperture and shutter speed indicators were positioned in the camera housing so as to be viewed through the binocular viewing system thereby to permit the setting of the indicators while simultaneously viewing the object area to be photographed. The setting of the aperture and shutter indicators may, for example, comprise aligning the indicators with reference lines or marks. If desired, automatic means for setting the aperture and shutter speed in accordance with the light intensity sensed by the photo cells means 20 may be incorporated into the camera, by conventional means.

In operation, the optical means 16 are adjusted to accommodate the spacing of the camera operator's eye 25, FIG. 5. The area to be photographed is then sighted, holding the camera as a pair of binoculars, through the binocular viewing system provided by the optical means 16, the hollow shafts 12a of the film spools 12, and the optical means 15. The focus control 21 is adjusted to focus the binocular viewing system on the object area to be photographed. Thereby, as before explained, the object lens system 10 is properly focused and the photo cells means 20 are appropriately positioned. The aperture setting control 23 and the shutter speed control 24 are then set in accordance with the light intensity sensed by the photo cell means 20, as before-mentioned, since the aperture and shutter speed indicators are viewed through the binocular viewing system, the setting of the aperture control 23 and shutter speed control 24 may be accomplished without taking the camera from the operator's eyes.

To take a photograph, the shutter release control button 22 is actuated to operate the camera's shutter mechanism. For the brief instant the shutter is open, light radiating from the object area to be photographed travels through the lens system 10 and is reflected off the light directing means 11 down onto the film 13, as shown in FIG. 6. Thereby, the film 13 is exposed and a photograph is taken. It is noted that the object lens system 10 operates to focus light radiating from the object area so as to form an image at the plane of the film 13. The film 13 is then advanced to its next frame by actuating the film advance means 14, and the camera is ready to take the next photograph.

It is noted that in a camera constructed in accordance with the present invention that the viewing and object lens systems may be made to be each interchangeable. Thereby, wide angle, telescopic or other lens systems may be used with the camera.

Thus, there has been provided an improved 35 mm. miniature camera which incorporates a binocular type viewing arrangement. The binocular type arrangement has the advantage of substantially eliminated parallax between the viewing system and the camera lens system. Further, rotatable light directing means are included in the binocular arrangement for accommodating the binocular viewing system to different eye spacings. An exemplary camera constructed in accordance with the present invention had the approximate dimensions of 1¼ inches high, 3 inches long and 4 inches wide. This provides a sufficient distance for accurate focusing on the film.

I claim:

1. A compact miniature camera, comprising:

an enclosed housing structure defining a front wall portion, a rear wall portion and a substantially flat bottom wall portion:

an object lens means mounted for receiving light radiating from an object area to be photographed through said front wall and the axis of said object lens being substantially parallel with the plane of said bottom wall portion;

light directing means mounted within said housing structure behind said object lens means, said light directing means being positioned along the optical axis of said object lens means for directing object area light transmitted by said object lens means at a 90° angle downwardly onto said bottom wall portion;

a pair of film spools each having a hollow shaft rotatably mounted within said housing structure extending from said front wall portion to said rear wall portion, said film spools being positioned one on either side of said object lens means with the axes of said spools substantially parallel to the optical axis of said object lens means;

means defining a film path from one of said spools to the other across the inside surface of said bottom wall portion positioning the film for exposure to light from said light directing means;

selectively operable means for winding film from one of said spools to the other whereby to move film across the inside surface of said bottom wall portion; and optical viewing means mounted to sight along the hollow shaft of each of said spools including a front movable lens and a rear rotatable double reflecting eyepiece whereby to form a binocular type viewing system for viewing the object area to be photographed with the optical axis of said viewing means being in the same plane as optical axis of said object lens, said front movable lens being movable longitudinally with respect to the axis of said spools for focusing said optical viewing means, said double reflecting eyepieces being rotatable about the axes of said spools to adjust said optical viewing means for different eye spacing.

2. The invention recited in claim 1, wherein:

said housing structure defines a top wall portion substantially parallel with said bottom wall portion and rounded side wall portions for connecting said top wall portion to said bottom wall portion, said rounded side wall portions being dimensioned to enclose said film spools, said rounded side wall portions being maintained a predetermined distance apart and in a predetermined alignment;

said front wall portion is substantially parallel with said back wall portion and perpendicular to said top and bottom wall portions; and said film spools are mounted symmetrically on either side of said object lens means with the axes of said film spools being substantially parallel to said bottom wall portion and substantially perpendicular to said front wall portion.

* * * * *

UNITED STATES PATENT OFFICE
CERTIFICATE OF CORRECTION

Patent No. 3687031  Dated August 29, 1972

Inventor(s) William E. Jahsman

It is certified that error appears in the above-identified patent and that said Letters Patent are hereby corrected as shown below:

The name of the inventor is correct on the drawing and in the Oath. In the printed Patent the name is misspelled. The inventor's name should be -

William E. Jahsman

Signed and sealed this 3rd day of April 1973.

(SEAL)
Attest:

EDWARD M. FLETCHER, JR.        ROBERT GOTTSCHALK
Attesting Officer               Commissioner of Patents